US006920103B2

United States Patent
Park

(10) Patent No.: US 6,920,103 B2
(45) Date of Patent: Jul. 19, 2005

(54) METHOD FOR ASSIGNING SPARE AREA IN OPTICAL RECORDING MEDIUM

(75) Inventor: Yong Cheol Park, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/351,521

(22) Filed: Jan. 27, 2003

(65) Prior Publication Data

US 2003/0117922 A1 Jun. 26, 2003

Related U.S. Application Data

(63) Continuation of application No. 09/437,151, filed on Nov. 10, 1999, now Pat. No. 6,542,450.

(30) Foreign Application Priority Data

Nov. 11, 1998 (KR) ............................... 98-48268
Nov. 12, 1998 (KR) ............................... 98-48371

(51) Int. Cl.$^7$ ............................................. G11B 7/00
(52) U.S. Cl. .................... 369/275.3; 369/53.15

(58) Field of Search ............... 369/44.26, 53.1, 369/275.3, 53.12, 53.15, 53.13, 53.17, 53.34, 53.35

(56) References Cited

U.S. PATENT DOCUMENTS 5,111,444 A * 5/1992 Fukushima et al. ........... 369/54
6,594,208 B1 * 7/2003 Ko et al. ................. 369/53.12

FOREIGN PATENT DOCUMENTS

JP    1-263955    * 10/1989    ................. 369/54

* cited by examiner

Primary Examiner—Nabil Hindi
(74) Attorney, Agent, or Firm—Birch, Stewart, Kolasch & Birch, LLP

(57) ABSTRACT

An optical recording medium and a method for assigning a spare area in a rewritable optical recording medium are provided, in which a supplementary spare area is assigned as necessary if an enlargement of the spare area is required. The present method includes (1) determining an allowable size of the supplementary spare area, and (2) assigning the supplementary spare area in variable increments within the allowable size determined in (1).

37 Claims, 9 Drawing Sheets (a)

| b31 | b30 b29 ...... b24 | b23                              b0 |
|---|---|---|
| entry type | reserved | defective sector number |

FIG.2B
Background Art

| b63 | b62 ...... b56 | b55 ...... b32 | b31 ...... b24 | b23 ...... b0 |
|---|---|---|---|---|
| FRM | reserved | sector number of first sector in defective block | reserved | sector number of first sector in replcacement block |

METHOD FOR ASSIGNING SPARE AREA IN OPTICAL RECORDING MEDIUM

This application is a Continuation of Ser. No. 09/437,151 filed Nov. 10, 1999 now U.S. Pat. No. 6,542,450.

BACKGROUND OF THE INVENTION

1. Field of the Invention

The present invention relates to a method for assigning a spare area in a rewritable optical recording medium.

2. Background of the Related Art

An optical storage medium is generally divided into a read only memory (ROM), a write once read many (WORM) memory into which data can be written one time, and rewritable memories into which data can be written several times. Rewritable optical storage medium, i.e. optical discs, include rewritable compact discs (CD-RW) and rewritable digital versatile discs (DVD-RW, DVD-RAM, DVD+RW).

A repeated recording/playback (RIP) of information to/from rewritable optical disks causes a change in the initial mix ratio of a recording layer formed to record the information on the optical disk. This change degrades the performance of the optical disk, causing errors in the recording/reproduction of information. Namely, the errors due to such degradation show up as defective areas during formatting, recording to and playback from the optical disk. Defective areas of a rewritable optical disk may also be caused by a scratch on its surface, particles of dirt and dust, or errors during manufacture. Therefore, in order to prevent writing into or reading out of a defective area, management of defective areas is necessary.

FIG. 1 shows a defect management area (DMA) in a lead-in area and a lead-out area of the optical disc to manage a defect area. Particularly, the data area is divided into a plurality of zones for the defect area management, where each zone is further divided into a user area and a spare area. The user area is where data is actually written and the spare area is used when a defect occurs in the user area.

There are generally four DMAs in one disc, e.g. DVD-RAM, two of which exist in the lead-in area and two exist in the lead-out area. Because managing defective areas is important, the same contents are repeatedly recorded in all four DMAs to protect the data. Each DMA comprises two blocks of 32 sectors, where one block comprises 16 sectors. The first block of the DMA, called a DDS/PDL block, includes a disc definition structure (DDS) and a primary defect list (PDL). The second block of the DMA, called an SDL block, includes a secondary defect list (SDL). The PDL corresponds to a primary defect data storage and the SDL corresponds to a secondary defect data storage.

The PDL generally stores entries of defective sectors caused during the manufacture of the disc or identified when formatting a disc, namely initializing and re-initializing a disc. As shown in FIG. 2A, each entry includes a sector number corresponding to a defective sector and an entry type. The sector number is listed in the carry order, and the entry type is listed by the origin of the defective sector. For example, the entry type is divided into a P-list, a $G_1$-list and a $G_2$-list, as defined by the disc manufacturer. More particularly, the defective sectors generated during the manufacture of the disc are stored in the P-list. The defective sectors found by a certification process during a formatting of a disc are stored in the G1-list, and the defective sectors converted from the SDL without a certification process are stored in the G2-list.

On the other hand, the SDL is arranged in block units and holds entries of either defective areas which may be generated after initialization or defective areas which could not be entered in the PDL during initialization. As shown in FIG. 2B, each entry of the SDL includes an area storing the sector number of a first sector of the block having a defective sector, and an area holding the sector number of a first sector of a replacement block. Additionally, 1 bit is assigned for the forced reassignment marking (FRM). A FRM bit value of 0 indicates that a replacement block is assigned and that the assigned block does not have a defect. A FRM bit value of 1 indicates that a replacement block has not been assigned or that the assigned replacement block has a defect. Thus, to record data in a defective block listed as a SDL entry, a new replacement block must be found to record the data. Accordingly, defective areas, i.e. defective sectors or defective blocks, within the data area are replaced with normal or non-defective sectors or blocks by a slipping replacement algorithm and a linear replacement algorithm.

The slipping replacement is utilized when a defective area or sector is recorded in the PDL. As shown in FIG. 3A, if defective sectors in the user area are recorded in the PDL, such defective sectors are skipped to the next available sector. By replacing the defective sectors by subsequent sectors, data is written to a normal sector. As a result, the user area into which data is written slips and occupies the spare area in the amount equivalent to the skipped defective sectors. For example, if there are two defective sectors in the P-list or $G_1$-list of the PDL, the data is written into the spare area by two sectors (m+n).

The linear replacement is utilized when a defective block is recorded in the SDL or when a defective block is found during playback. As shown in FIG. 3B, if defective blocks m and n, corresponding to blocks in either the user or spare area, are recorded on the SDL, such defective blocks are replaced by normal blocks in the spare area and the data to be recorded in the defective block are recorded in an assigned spare area. To achieve the replacement, a physical sector number (PSN) assigned to a defective block remains, while a logical sector number (LSN) is moved to the replacement block along with the data to be recorded.

As defective areas are compensated utilizing the spare area, methods of assigning the spare area plays an important role in the defective area management. Typically, the spare area may be allocated in each zone or group of the data area or may be allocated in a designated portion of the data area. One method is to allocate the spare area at the top of the data area, as shown in FIG. 4. In such case, the spare area is called a Primary Spare Area (PSA). Namely, the data area excluding the primary spare area becomes the user area.

The primary spare area is assigned during an initial formatting process and is not given a LSN. Thus, the primary spare area may be assigned when a manufacturer produces the optical disc or when a user initially formats an empty disc. A variety of sizes can be allocated for the primary spare area. For example, in order to have an initial data recording capacity, i.e. the initial user area, of 4.7 GB (Giga byte) in a disc with a size of 120 mm, 26 MB (Mega Byte) may be allocated as the primary spare area. Also, to have an initial data recording capacity of 4.5 GB, 145 MB may be assigned as the primary spare area.

Moreover, if defective sectors are discovered and registered on the PDL during the initial formatting or re-formatting, the recording capacity would be proportionately reduced since data cannot be recorded on the defective sectors. Therefore, to maintain the initial data recording capacity, a portion of the primary spare area equivalent to the defective sectors registered on the PDL slips into or becomes a part of the user area. Accordingly, the PSN of the user area to which a value of LSN=0 is assigned varies depending upon the defective sectors registered on the PDL. Moreover, the primary spare area is slipped into the user area in a reverse order, even when replacement blocks are assigned from the primary spare area for the linear replacement.

If the primary spare area becomes full by slipping or linear replacement, as shown in FIG. 5A, a new spare area may be assigned near the end of the user area. Such additional spare area is called a supplementary spare area (SA-sup). As the assigned supplementary spare area also becomes full, the supplementary spare area may be enlarged as shown in FIG. 5B. As in the primary spare area, the spare blocks in the supplementary spare area are also used in a reverse order during the linear replacement such that the supplementary spare area can easily be enlarged as necessary.

However, there are cases when additional supplementary spare area cannot be assigned even when an enlargement is necessary. For example, assume the enlarged supplementary spare area becomes full while data, i.e. Files 1 and 2, are recorded to the end of the user area as shown in FIG. 5B. Under such condition, assume File 1 is erased and re-recorded. If a new defective block is found in the user area, the supplementary spare area must be further enlarged. Nevertheless, because File 2 is already recorded in the user area in which the supplementary spare area should be assigned, an enlargement is not possible.

One way to overcome this problem is by a de-fragmentation. Namely, data stored in the user area, including the data recorded in area to which the supplementary spare area must be assigned, can be transferred to an upper portion or an empty portion of the user area. However, de-fragmentation often takes a great amount of time and is complicated. Since a large volume of data such as 4.7 GB may be rewritten, the time period may be almost equivalent to the time period required for a full formatting.

Moreover, supplementary spare area is enlarged by fixed increments. Accordingly, if less than the fixed increment is available in the user area, even after a de-fragmentation, the supplementary spare area cannot be enlarged. For example, if the fixed increment is 32 MB, but the enlargeable supplementary spare area is 31 MB, the available 31 MB of the user area cannot be allocated as the supplementary spare area. Finally, a maximum size into which the supplementary spare area may be enlarged is not fixed. Therefore, an indefinite enlargement of the supplementary spare area would cause problems in the spare area management by the DMA.

SUMMARY OF THE INVENTION

Accordingly, an object of the present invention is to solve at least the problems and disadvantages of the related art.

An object of the present invention is to provide a method for assigning a spare area in a rewritable optical recording medium in which a supplementary spare area is assigned in variable increments. Particularly, the supplementary spare area is enlarged up to a maximum size.

Another object of the present invention is to provide a method for assigning a spare area in a rewritable optical recording medium in which a supplementary spare area is enlarged even if an available area is smaller than a fixed increment.

A further object of the present invention is to provide a method for assigning a spare area in a rewritable optical recording medium in which the supplementary spare area is assigned in variable increments within an allowable size, wherein the variable increment is a multiple of a minimum increment.

A still further object of the present invention is to provide a method for assigning a spare area in a rewritable optical recording medium in which a maximum allowable size of a supplementary spare area is determined, and the supplementary spare area is assigned only once in the determined size when necessary.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, the method for assigning a supplementary spare area in an optical recording medium includes (1) determining an allowable size of the supplementary spare area, and (2) assigning the supplementary spare area in variable increments within the allowable size. In the above method, the allowable size is a size which a DMA can manage and varies with a condition of the DMA. Particularly, the allowable size is varied with a size of an initially assigned spare area and varies with an amount of a data if the data is recorded within the maximum allowable size. Also, the supplementary spare area is assigned by enlarging in variable increments as necessary. The variable sized increment may be a multiple of a preset minimum increment unit.

Moreover, the supplementary spare area may be assigned only once within the allowable size rather than by variable increments, and if an assignable supplementary spare area is additionally secured, the supplementary spare area is again assigned only once within the assignable area when required.

In another embodiment of the present invention, a method for assigning a spare area in an optical recording medium assigns available area to the supplementary spare area even if the available area is smaller than a fixed increment for assigning the supplementary spare area. Still, in another embodiment of the present invention, a method for assigning a spare area in an optical recording medium includes assigning the all available area to the supplementary spare area at one time if the available area is smaller than two times the fixed increment.

In a further embodiment of present invention, a method for assigning a spare area in an optical recording medium, wherein the spare area is assigned to an initial optical recording medium and a separate supplementary spare area is assigned as necessary when enlargement of the spare area is required, includes (1) determining an allowable size of the supplementary spare area, and (2) assigning the supplementary spare area in variable increments as necessary within the allowable size determined in (1), wherein the variable increment is a multiple of a preset minimum increment unit.

BRIEF DESCRIPTION OF THE DRAWINGS

The invention will be described in detail with reference to the following drawings in which like reference numerals refer to like elements wherein:

FIG. 2A illustrates a structure of a PDL entry in the related art;

FIG. 2B illustrates a structure of a SDL entry in the related art;

DETAILED DESCRIPTION OF THE PREFERRED EMBODIMENTS

Figure 1:
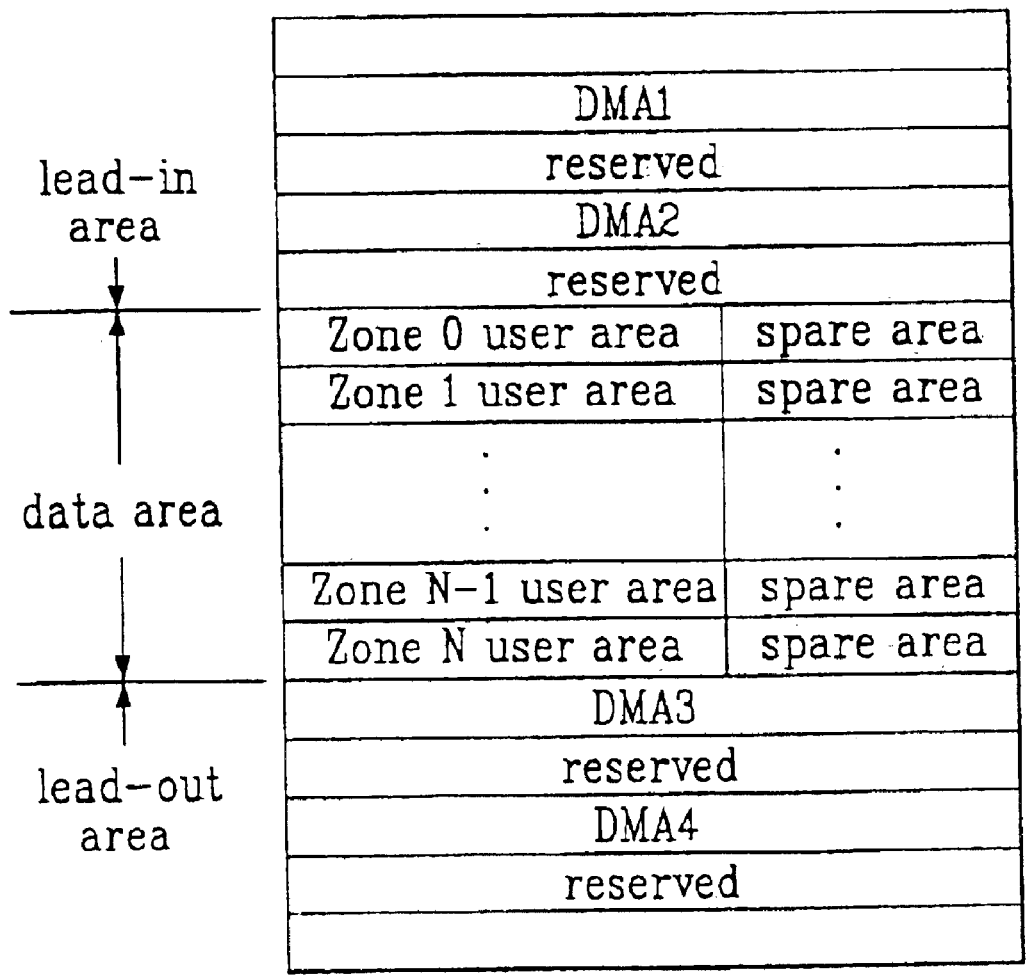
FIG. 1 illustrates a structure of an optical disc in the related art.
Figure 3A:
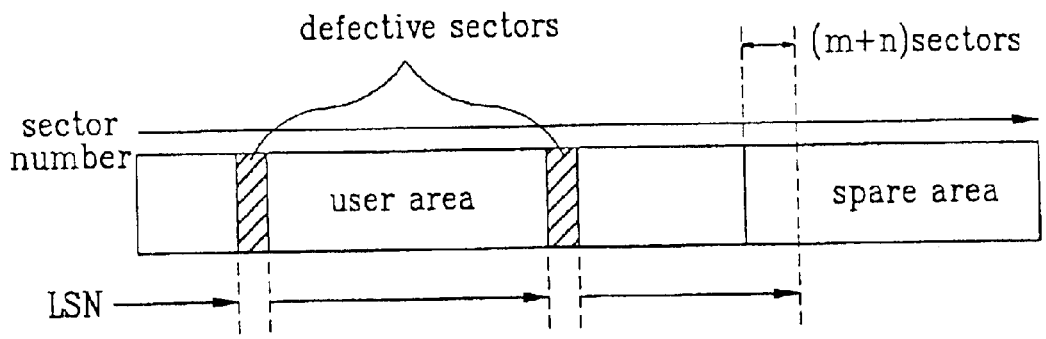
FIG. 3A illustrates a slipping replacement in the related art.
Figure 3B:
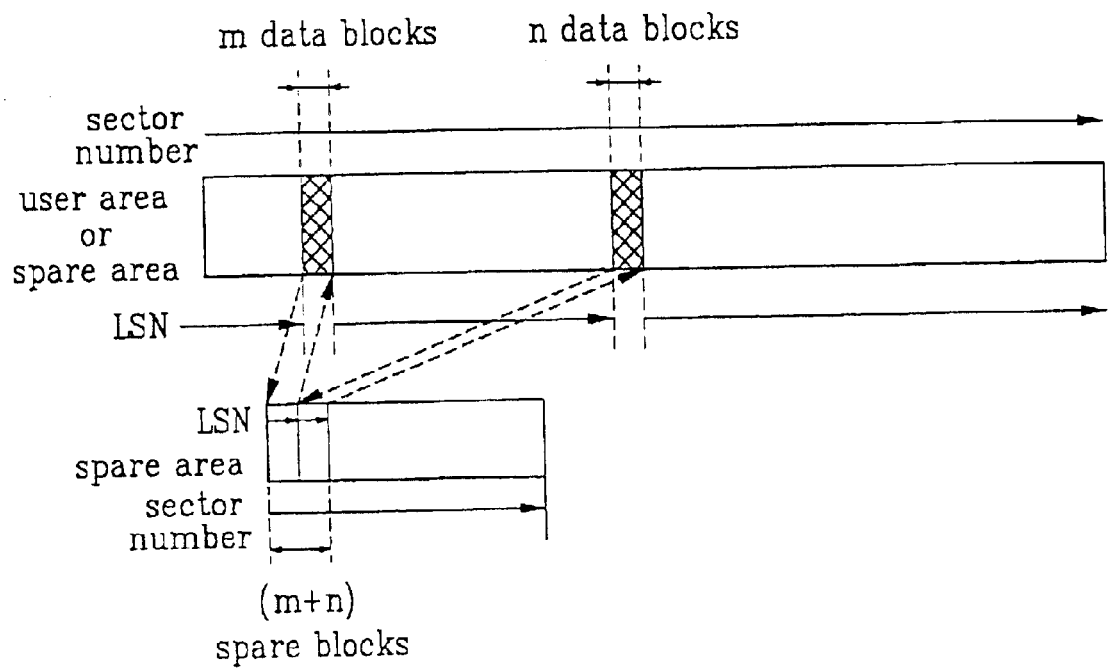
FIG. 3B illustrates a linear replacement in the related art.
Figure 4:
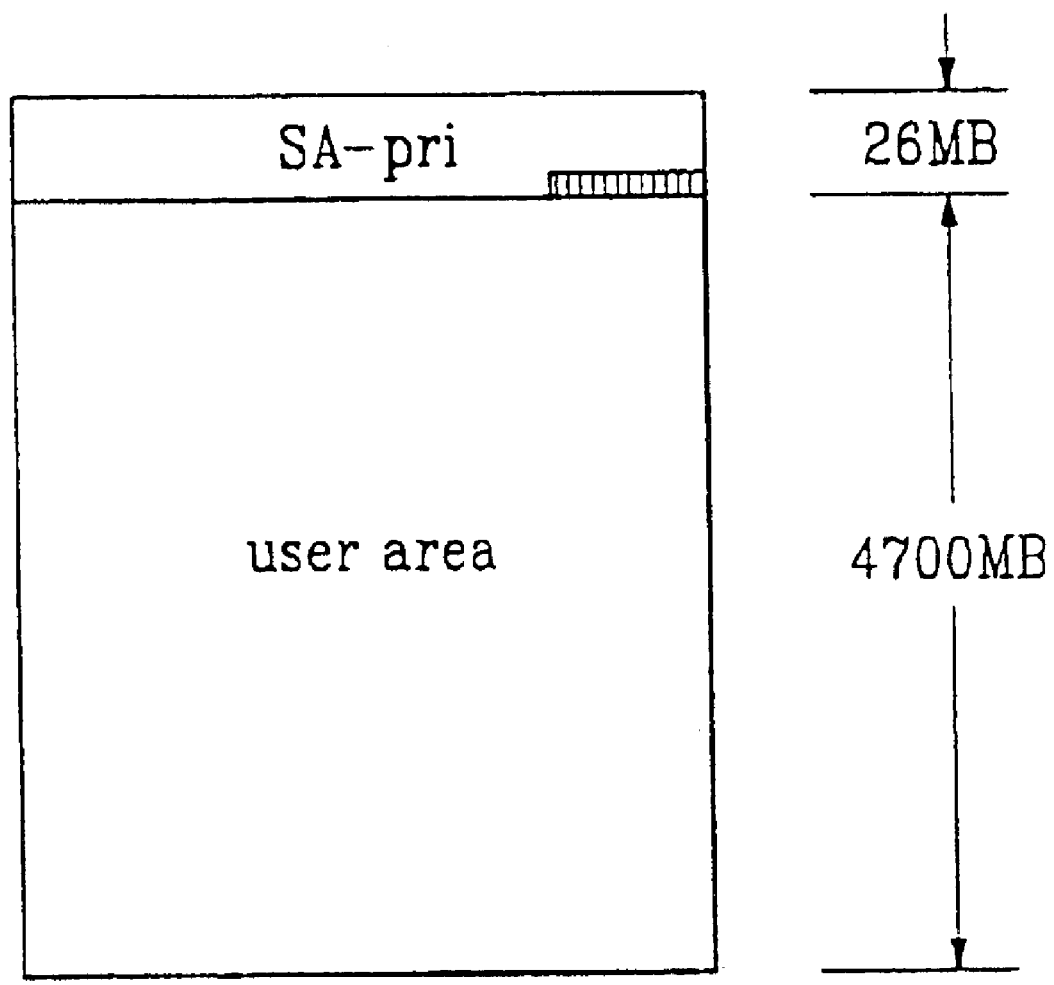
FIG. 4 illustrates an example when a spare area is assigned at a top of a data area.
Figure 5:
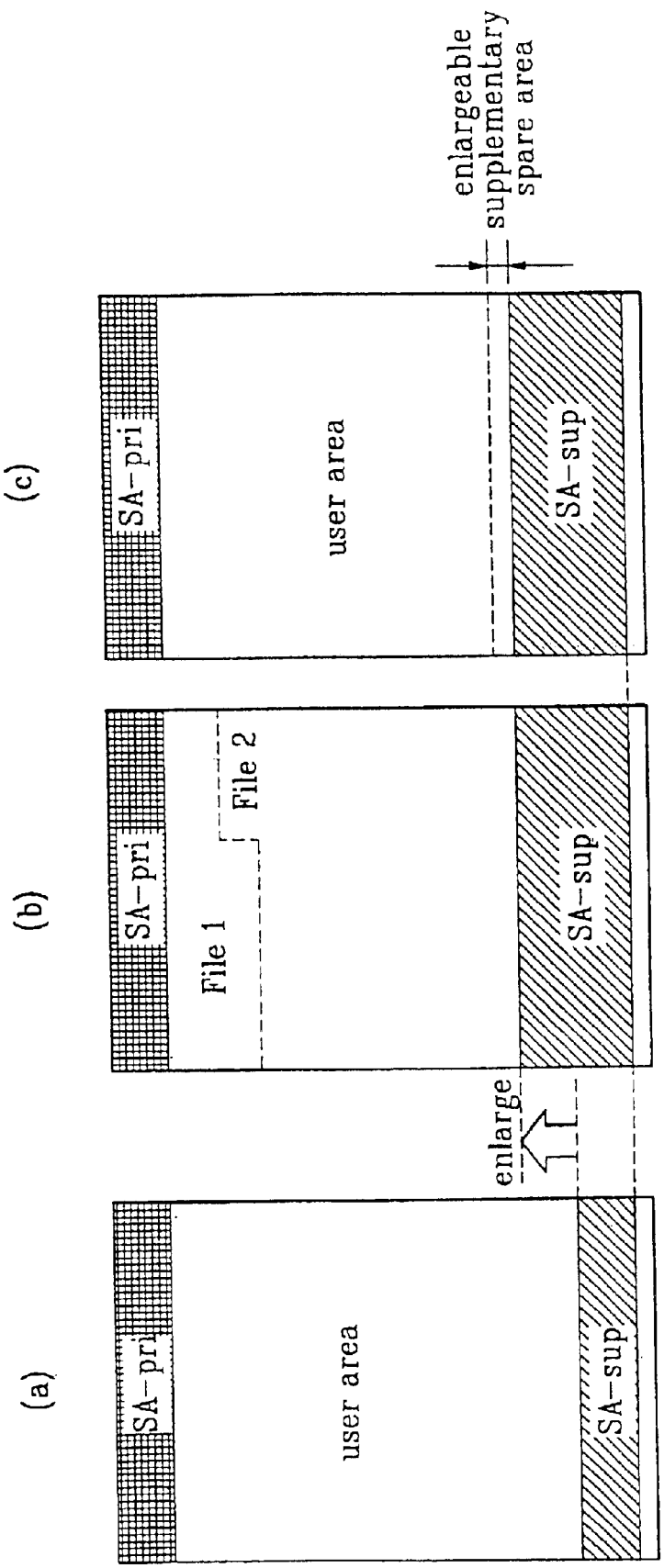
FIGS. 5A~5C illustrate examples when a supplementary spare area is assigned to a disc having a primary spare area as in FIG. 4, and the supplementary spare area is enlarged.

Reference will now be made in detail to the preferred embodiments of the present invention, examples of which are illustrated in the accompanying drawings. Generally, the present invention prevents an execution of de-fragmentation when more area needs to be secured for assigning the supplementary spare area, or allows an assignment/enlargement of the supplementary spare area when the available area is smaller than a preset fixed increment.

In the present invention, a size of an allowable supplementary spare area is first determined. For example, in the 120 mm disc with an initial data recording capacity of 4.7 GB, the size of an allowable supplementary spare area may be approximately 120 MB, which is similar to the size of the largest defective area that the DMA can manage. Namely, there may be cases when defective sectors found in during formatting cannot be listed on the PDL, when the SDL cannot be converted into the PDL, or when a defective block found during data writing/reading cannot be listed on the SDL. This is because the number of entries which can be listed on the DMA is limited according to a DMA condition. Equation 1 below is one example of a DMA condition for the 120 mm disc above, wherein $S_{PDL}$ denotes a number of sectors used for maintaining the PDL entry, $S_{SDL}$ denotes a number of sectors used for maintaining the SDL entry, $E_{PDL}$ denotes a number PDL entries, $E_{SDL}$ denotes a number SDL entries, and $\lfloor P \rfloor$ denotes a greatest integer not greater than P.

$$S_{PDL} + S_{SDL} \le 16 \text{ sectors, where} \quad \text{[Equation 1]}$$
$$1 \le S_{PDL} \le 15, 1 \le S_{SDL} \le 15$$

-continued
$$S_{PDL} = \left\lfloor \frac{(E_{PDL} \times 4 + 4) + 2047}{2048} \right\rfloor$$
$$S_{SDL} = \left\lfloor \frac{(E_{SDL} \times 8 + 24) + 2047}{2048} \right\rfloor$$

Thus, a total number of sectors used for the PDL and SDL cannot exceed 16 sectors while a total number of sectors used for each the PDL or SDL cannot exceed 15.

According to Equation 1, a maximum size of defective area that the DMA can manage is approximately 145 MB (121 MB+∀). Since the defective area that one SDL sector can manage is 8 MB and the defective area that one PDL sector can manage is 1 MB, fifteen SDL sectors (120 MB=8*15) plus one PDL sector (1 MB) make 121 MB. Furthermore, an ∀ of approximately 24 MB is added to 121 MB in consideration of defects present in the spare area, thereby resulting in 145 MB. The area of 145 MB is approximately 3% of the 4.7 GB, i.e. up to 3% can be assigned as the spare area. Therefore, when an initial recording capacity of the user area is 4.7 GB and the primary spare area is 26 MB, up to approximately 119 MB can be assigned as the supplementary spare area.

As DMA conditions such as Equation 1 changes, the maximum allowable size of the supplementary spare area would also change. Moreover, the maximum allowable size of the supplementary spare area may further be varied with the size of the primary spare area. Accordingly, upon determining the maximum allowable size of the supplementary spare area, the supplementary spare area is assigned within the maximum allowable size of the supplementary spare area as described below.

Figure 6:
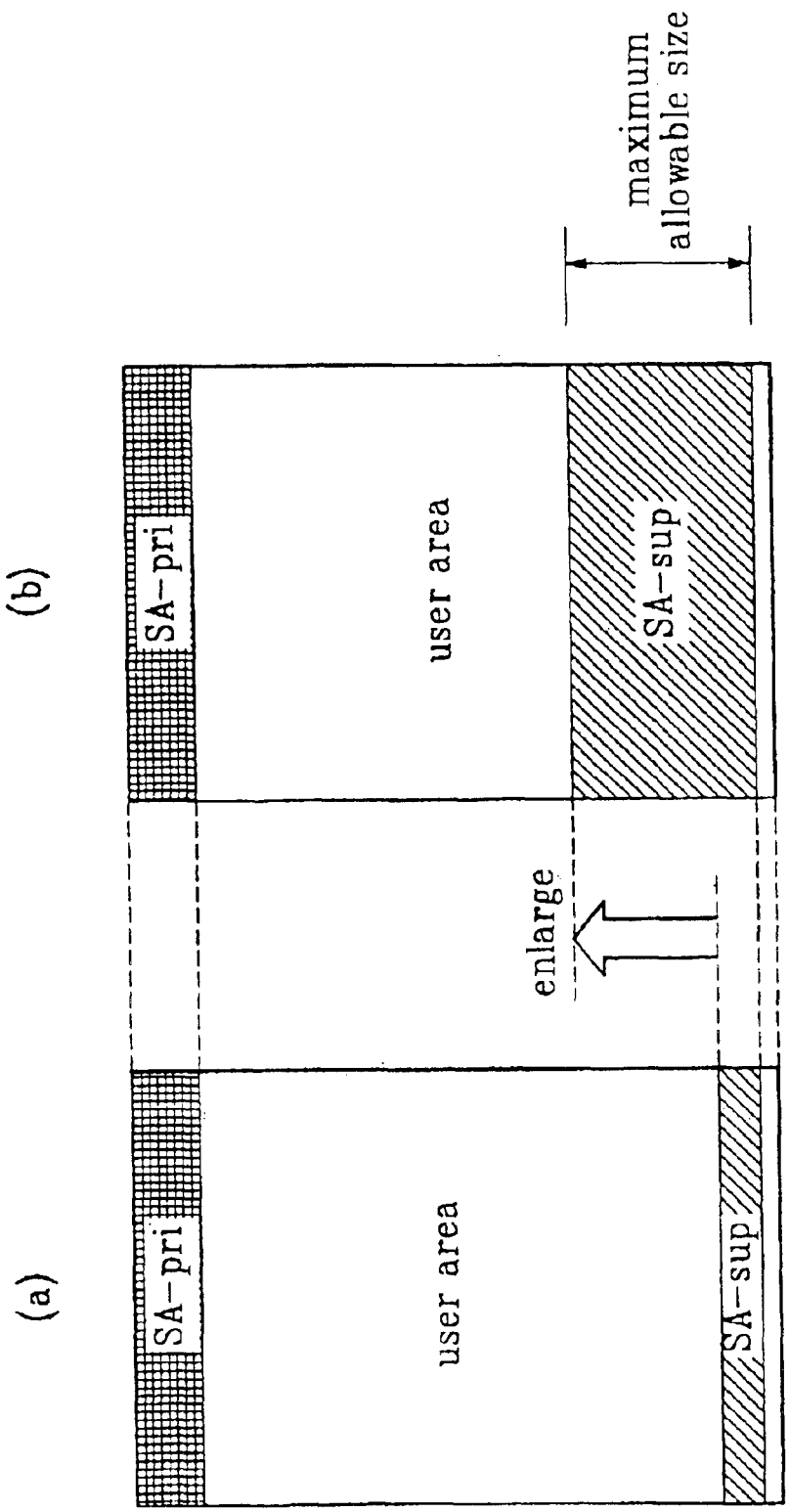
FIGS. 6A and 6B illustrate examples when a supplementary spare area is enlarged by variable increments within an allowable size in accordance with an embodiment of the present invention.
Figure 7:
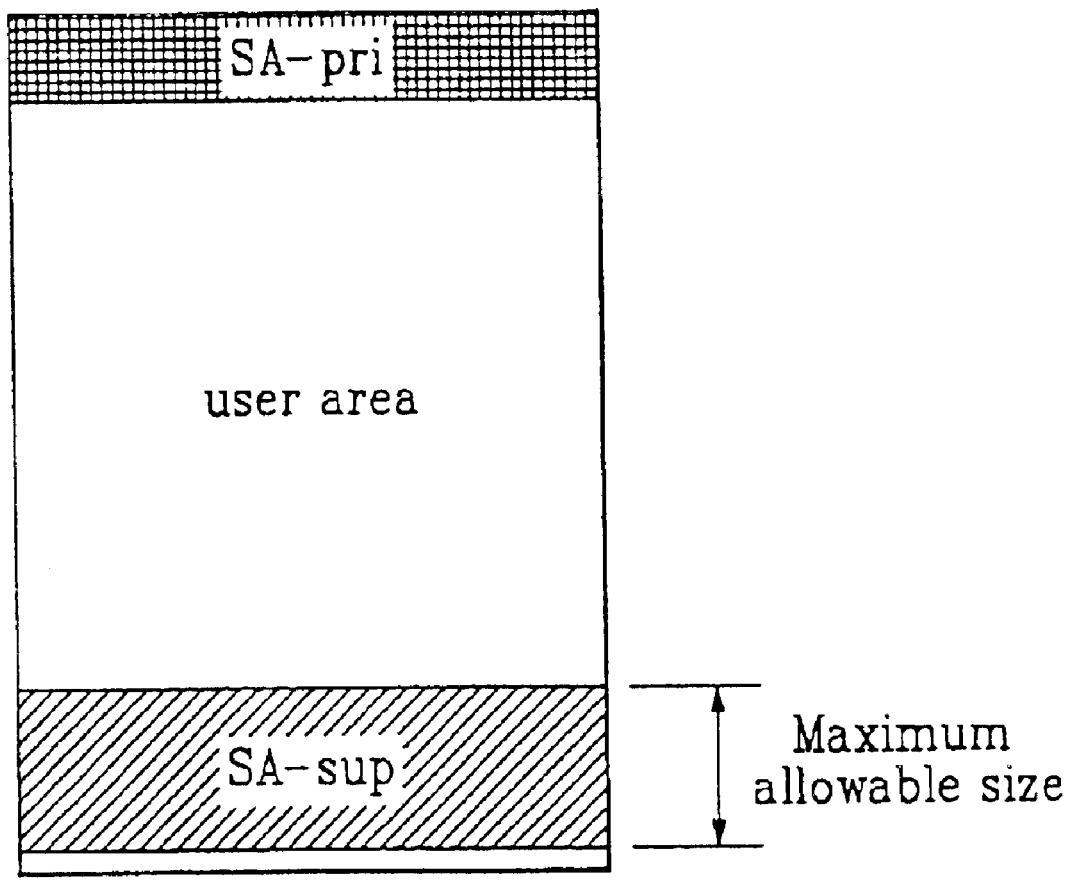
FIG. 7 illustrates an example when a supplementary spare area is assigned once within an allowable size in accordance with an embodiment of the present invention.

In the first embodiment of the present invention, variable increments of an available area are assigned as the supplementary spare area within the maximum allowable size of the supplementary spare area. Referring to FIGS. 6A and 6B, the supplementary spare area is allocated a multiple times within the allowable size as required and the allocation increments are not constant, but variable. Also, a previously allocated supplementary spare area must be fully utilized before a next allocation of supplementary spare area is activated. For example, if the maximum allowable size is 120 MB, the supplementary spare area may be assigned/enlarged in variable increments, such as 30 MB, 20 MB, or 50 MB within 120 MB depending upon the defect processing situation during the data writing/reproduction.

If data is already recorded in the area within the maximum allowable size, the area below the last position in which data is recorded would be considered as the maximum enlargeable supplementary area. Accordingly, the supplementary spare area is assigned and enlarged in variable increments within the maximum enlargeable supplementary area. As additional area within the maximum allowable size is secured, through for example data deletion or de-fragmentation, the supplementary spare area is enlarged as necessary within the secured area of the maximum allowable size. Therefore, additional area may be allocated as the supplementary spare area without a de-fragmentation even when the size of the available area for supplementary spare area enlargement is small due to data recorded within the maximum allowable size.

On the other hand, the supplementary spare area may be assigned one time, rather than by multiple increments, within the maximum allowable size. In such case, the size of the supplementary spare area would be equivalent to or less than the size of the maximum allowable size shown in FIG.

7. Namely, if the maximum allowable size is 120 MB, the entire 120 MB or less than 120 MB may be assigned at one time as the supplementary spare area, based upon a predetermined spare area size. For example, in the above case of 120 MB of allowable spare area, the size of the predetermined spare area may be 120 MB, 100 MB or even 50 MB and the entire predetermined spare area would be allocated as the supplementary spare area in a single assignment. However, if data is recorded within the predetermined spare area of for example 120 MB, less than 120 MB would be available for the assignment of the supplementary spare area. Accordingly, if the entire predetermined spare area cannot be allocated, the available area of the predetermined spare area is allocated as the supplementary spare area in one assignment.

For example, the supplementary spare area may not be required for recording File 1, but may be required while recording a later portion of File 2 in the optical medium. However, at that time, the available area for supplemental spare area allocation may be smaller than the predetermined spare area due to File 2 being recorded within the predetermined spare area. Accordingly, if the available area, i.e. the area starting from the position in which the last data of File 2 has been recorded, is 100 MB while the predetermined spare area is 120 MB, the area of 100 MB is allocated as the supplementary spare area in one assignment. As additional area for allocation within the predetermined spare area is secured, the additional area is allocated as to the supplementary spare area, as necessary, also by one assignment. For example, if File 2 is erased so that 20 MB is secured, the additional area of 20 MB is allocated to the supplementary spare area by one assignment.

Therefore, all available area of the predetermined spare area within the maximum allowable size is allocated as the supplementary spare area by a single assignment, and if the available area is smaller than the predetermined spare area, additional area may be allocated by a single assignment as necessary once secured. Moreover, when a slipping occurs in a supplementary spare area enlarged according to the method in the related art, the slipping occurs in a reverse order to maintain a continuous supplementary spare area enlargement. As a result, the user area becomes discontinuous. Thus, when the supplementary spare area is allocated by one assignment according to the present invention, the supplementary spare area may be utilized in a rising order to maintain continuity of the user area.

In a second embodiment of the present invention, the supplementary spare area is assigned by a fixed increment, as necessary. However, the supplementary spare area is also assigned in a variable increment when an available area for enlargement is smaller than a fixed increment or is smaller than two times the fixed increment. Thus, the supplementary spare area may be enlarged within the entire area of the maximum allowable size.

Also, similar to the first embodiment, if data is recorded within the area of the maximum allowable size, the area below the last position in which data is recorded would be considered as the maximum enlargeable supplementary area. Accordingly, the supplementary spare area is assigned and enlarged in within the maximum enlargeable supplementary area and as additional area within the maximum allowable size is secured, the supplementary spare area is enlarged as necessary within the secured area of the maximum allowable size.

Figure 8:
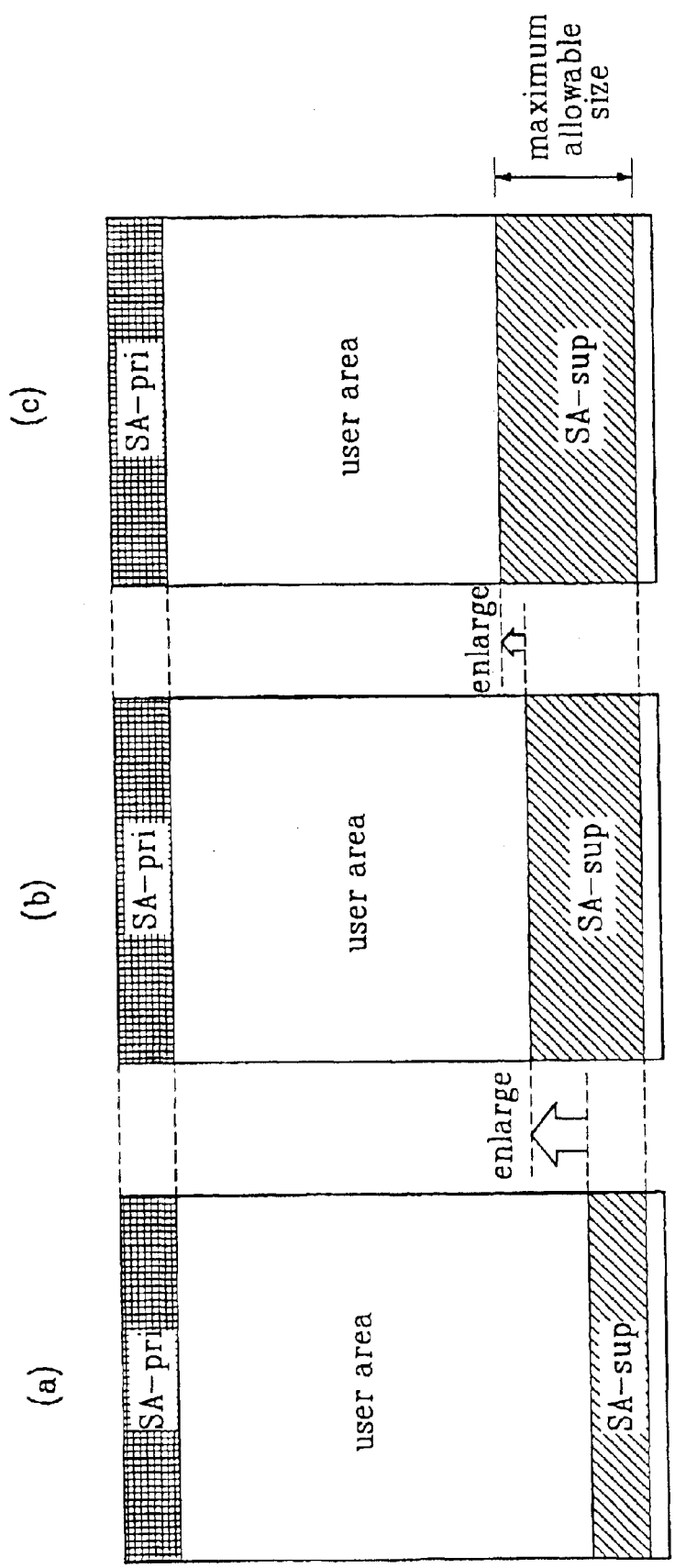
FIGS. 8A~8C illustrate examples when a remained area is assigned to a supplementary spare area when an enlargeable supplementary spare area is smaller than a preset fixed increment in accordance with an embodiment of the present invention.

For example, if the fixed increment for enlargement within the maximum allowable size shown in FIGS. 8A–8C is 32 MB, the supplementary spare area is enlarged in increments of 32 MB as necessary until less than 32 MB remains within the maximum allowable size. If 29 MB remains unallocated within the maximum allowable size when more supplementary spare area is required, less than the fixed increment, i.e. 29 MB, is assigned to the supplementary spare area. Therefore, an interruption by a need for a defragmentation to secure more available area may be avoided.

Figure 9:
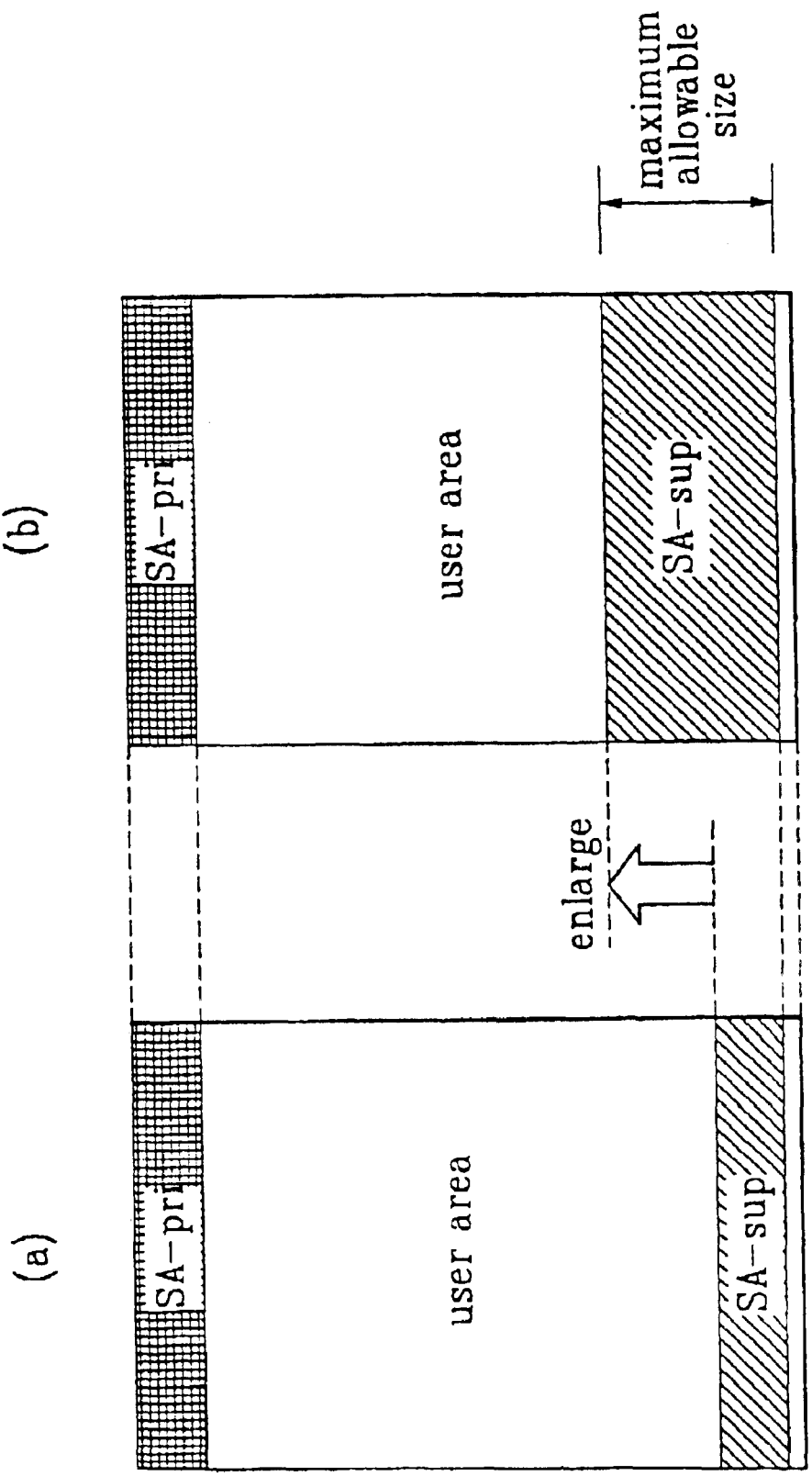
FIGS. 9A and 9B illustrate examples when a remained area is assigned to a supplementary spare area at one time when an enlargeable supplementary spare area is smaller than two times of a preset fixed increment in accordance with an embodiment of the present invention.

Alternatively, the supplementary spare area may be enlarged in fixed increments until the available area for allocation within the maximum allowable size is smaller than two times the fixed increment, shown in FIGS. 9A and 9B. In such case, the entire available area may be allocated as the supplementary spare area by a single assignment even if the available area is larger than the fixed increment. For example, if the fixed increment is 32 MB, the supplementary spare area is enlarged as necessary by 32 MB until less than 64 MB, e.g. 61 MB, remains within the maximum allowable size. At that time, if the supplementary spare area needs to be enlarged, the entire area of 61 MB is allocated as the supplementary spare area by a single assignment.

Therefore, the available area within the maximum allowable size may be assigned as the supplementary spare area in fixed increments initially, then by less or by more than the fixed increment in the last assignment. Also, as in the first embodiment, additional area may be allocated as the supplementary spare area without a de-fragmentation even when the size of the available area for supplementary spare area enlargement is smaller than the fixed increment.

In the third embodiment of the present invention, the supplementary spare area is also assigned many times as necessary by variable increments. However, the variable increment is a multiple of a minimum increment unit. Namely, the supplementary spare area may be assigned according to a selection of the host or user of the optical disc. This selection, i.e. assignment of supplementary spare area, should preferably be made before the primary spare area becomes full. Otherwise, if the selection is made after fully utilizing the primary spare area, the drive would already be operative making further assignment difficult. For example, if a new defect is found when the primary spare area is full and a replacement of the defect is needed, an assignment of the supplementary spare area at that time would be difficult due to the required amount of time period.

Therefore, a portion such as 1 MB of the primary spare area should remain prior to newly assigning a supplementary spare area. If the remaining size of the primary spare area is too small, the same problem as when the supplementary spare area is assigned after the primary spare area becomes full may arise. Accordingly, a minimum increment unit such as the 1 MB is set when the supplementary spare area is newly assigned or enlarged thereafter. That is, the supplementary spare area may be assigned in multiples of 1M, e.g. 4M, 8M, 17M, 32M, 1M, or 10M. If the minimum increment is determined to be 2M, the supplementary spare area may be assigned in multiples of 2M, e.g. 4M, 8M, 20M, 32M, 2M, 28M. Moreover, as in the second embodiment of the present invention, if the minimum increment unit is 1 MB and more supplementary spare area is required when an available area which can be assigned is 1.5 MB, the area of 0.5 MB may be additionally assigned after assigning 1M or the entire area of 1.5M may be assigned at one time.

As discussed above, the method for assigning a spare area in a rewritable optical recording medium of the present invention can dispense with the de-fragmentation, which often requires a great amount of time and is complicated, when the supplementary spare area cannot be further assigned even if required because the enlargeable supplementary spare area is smaller than the preset fixed increment. Also, as the maximum size of the enlargeable supplementary spare area is set, problems such as infinite enlargement of the spare area is eliminated, thereby improving the system performance.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An optical recording medium which has two types of spare areas, the optical recording medium comprising:
   a first spare area which is assigned to a fixed size; and
   a second spare area which is assigned to a variable size within a pre-determined maximum allowable size, wherein the assigned variable size of the second spare area is a multiple of a minimum unit.

2. The optical recording medium of claim 1, wherein the second spare area is assigned in variable increments.

3. The optical recording medium of claim 1, wherein the second spare area is assigned initially by a fixed increment.

4. The optical recording medium of claim 3, wherein the second spare area is assigned in a variable increment if an available area within the predetermined maximum allowable size is smaller than the fixed increment.

5. The optical recording medium of claim 3, wherein the second spare area is assigned in a variable increment if an available area within the predetermined maximum allowable size is smaller than twice the fixed increment.

6. The optical recording medium of claim 1, wherein the second spare area is assigned according to a selection of a host or user of the optical recording medium.

7. The optical recording medium of claim 1, wherein the second spare area is assigned in a variable increment if an available area within the predetermined maximum allowable size is smaller than the minimum unit.

8. The optical recording medium of claim 1, wherein the second spare area is assigned in a variable increment if an available area within the predetermined maximum allowable size is smaller than twice the minimum unit.

9. The optical recording medium of claim 1, wherein the first spare area is close by a lead-in area of the optical recording medium, and the second spare area is close by a lead-out area of the optical recording medium.

10. A method for assigning a spare area in an optical recording medium having two types of spare areas, the method comprising:
    assigning a first spare area to a fixed size; and
    assigning a second spare area to a variable size within a pre-determined maximum allowable size, wherein the assigned variable size of the second spare area is a multiple of a minimum unit.

11. The method of claim 10, wherein the second spare area is assigned in variable increments.

12. The method of claim 10, wherein the second spare area is assigned initially by a fixed increment.

13. The method of claim 12, wherein the second spare area is assigned in a variable increment if an available area within the predetermined maximum allowable size is smaller than the fixed increment.

14. The method of claim 12, wherein the second spare area is assigned in a variable increment if an available area within the predetermined maximum allowable size is smaller than twice the fixed increment.

15. The method of claim 10, wherein the second spare area is assigned according to a selection of a host or user of the optical recording medium.

16. The method of claim 10, wherein the second spare area is assigned in a variable increment if an available area within the predetermined maximum allowable size is smaller than the minimum unit.

17. The method of claim 10, wherein the second spare area is assigned in a variable increment if an available area within the predetermined maximum allowable size is smaller than twice the minimum unit.

18. The method of claim 10, wherein the first spare area is close by a lead-in area of the optical recording medium, and the second spare area is close by a lead-out area of the optical recording medium.

19. An optical recording medium which has two types of spare areas, the optical recording medium comprising:
    a first spare area which is assigned to a fixed size; and
    a second spare area which is assigned to a variable size within or to a pre-determined maximum allowable size, wherein the variable size of the second spare area is assigned in a first size smaller than the pre-determined maximum allowable size, and alternately assignable in a second size of the pre-determined maximum allowable, size.

20. The optical recording medium of claim 19, wherein the second spare area is assigned according to a selection of a host or user of the optical recording medium.

21. The optical recording medium of claim 19, wherein the first spare area is located at an inner radius of the optical recording medium, and the second spare area is located at an outer radius of the optical recording medium.

22. The optical recording medium of claim 21, wherein the second spare area is assignable alternately from an outer radius to an inner direction.

23. A method for assigning a spare area in an optical recording medium having two types of spare areas, the method comprising:
    assigning a first spare area to a fixed size; and
    assigning a second spare area to a variable size within or to a pre-determined maximum allowable size, wherein the second spare area is assigned in a first size smaller than the pre-determined maximum allowable size, and alternately assignable in a second size of the pre-determined maximum allowable size.

24. The method of claim 23, wherein the second spare area is assigned according to a selection of a host or user of the optical recording medium.

25. The method of claim 23, wherein the second size of the second spare area is assigned during a formatting process of the optical recording medium, or in the process of data recording or reading alternately after being assigned in the first size.

26. The method of claim 23, wherein the first spare area is located at an inner radius of the optical recording medium, and the second spare area is located at an outer radius of the optical recording medium.

27. The method of claim 26, wherein the second spare area is alternately assignable from an outer radius to an inner direction.

28. A method for assigning a spare area in an optical recording medium having two types of spare areas, the method comprising:

assigning a first spare area to a fixed size; and assigning a second spare area to a variable size within or to a pre-determined maximum allowable size, wherein the second spare area is assigned in a first size smaller than the pre-determined maximum allowable size, and additionally assignable in a second size to the pre-determined maximum allowable size.

29. The method of claim 28, wherein the second spare area is additionally assignable from an outer radius to an inner direction.

30. The method of claim 29, wherein the second size of the second spare area corresponds to a size equal to the first size subtracted from the pre-determined maximum allowable size.

31. The method of claim 28, wherein the first size of the second spare area is smaller than the second size.

32. The method of claim 28, wherein the second size of the second spare area is assigned during a formatting process of the optical recording medium, or in the process of data recording or reading alternately after being assigned in the first size.

33. An optical recording medium which has two types of spare areas, the optical recording medium comprising:

a first spare area which is assigned to a fixed size; and a second spare area which is assigned to a variable size within or to a pre-determined maximum allowable size, wherein the variable size of the second spare area is assigned in a first size smaller than the pre-determined maximum allowable size, and additionally assignable in a second size to the pre-determined maximum allowable size.

34. The optical recording medium of claim 33, wherein the second spare area is additionally assignable from an outer radius to an inner direction.

35. The optical recording medium of claim 34, wherein the second size of the second spare area corresponds to a size equal to the first size subtracted from the pre-determined maximum allowable Size.

36. The optical recording medium of claim 33, wherein the first size of the second spare area is smaller than the second size.

37. The optical recording medium of claim 33, wherein the second size of the second spare area is assigned during a formatting process of the optical recording medium, or in the process of data recording or reading alternately after being assigned in the first size.

* * * * *